US011895746B2

(12) United States Patent
Fang et al.

(10) Patent No.: US 11,895,746 B2
(45) Date of Patent: Feb. 6, 2024

(54) CLASS 2 CIRCUIT PROTECTION

(71) Applicant: SIGNIFY HOLDING B.V., Eindhoven (NL)

(72) Inventors: Yuhong Fang, Naperville, IL (US); Bernd Clauberg, Schaumburg, IL (US); Ashwin Premraj, Des Plaines, IL (US)

(73) Assignee: SIGNIFY HOLDING B.V., Eindhoven (NL)

( * ) Notice: Subject to any disclaimer, the term of this patent is extended or adjusted under 35 U.S.C. 154(b) by 131 days.

(21) Appl. No.: 17/598,263

(22) PCT Filed: Mar. 25, 2020

(86) PCT No.: PCT/EP2020/058279
§ 371 (c)(1),
(2) Date: Sep. 25, 2021

(87) PCT Pub. No.: WO2020/193599
PCT Pub. Date: Oct. 1, 2020

(65) Prior Publication Data

US 2022/0191985 A1 Jun. 16, 2022

Related U.S. Application Data

(60) Provisional application No. 62/825,106, filed on Mar. 28, 2019.

(30) Foreign Application Priority Data

Apr. 5, 2019 (EP) .................................... 19167640

(51) Int. Cl.
*H05B 45/24* (2020.01)
*H05B 45/46* (2020.01)
(Continued)

(52) U.S. Cl.
CPC ............. *H05B 45/24* (2020.01); *H05B 45/46* (2020.01); *H05B 45/54* (2020.01)

(58) Field of Classification Search
CPC ......... H05B 45/24; H05B 45/46; H05B 45/54
See application file for complete search history.

(56) References Cited

U.S. PATENT DOCUMENTS 9,118,246 B2 8/2015 Buthker
2011/0037407 A1* 2/2011 Ahn ....................... H05B 45/58 315/294
(Continued)

OTHER PUBLICATIONS

Hai Chen et al, "A SIMO Parallel-String Driver IC for Dimmable LED Backlighting with Local Bus Voltage Optimization and Single Time-Shared Regulation Loop"; IEEE Transactions on Power Electronics Institute of Electrical and Electronics Engineers, vol. 27, No. 1, Jan. 1, 2012, pp. 452-462, ISSN: 0885-8993, DOI: 10_1109/TPE.2011.2160404.

*Primary Examiner* — Henry Luong

(57) ABSTRACT

A device, system, and method protect circuits of a lighting device. The lighting device includes a current source generating a current and a first load and a second load receiving the current. The lighting device includes an inductor positioned between the current source and the first and second loads that balances the current powering the first and second loads. The lighting device includes a detector monitoring a voltage peak of the first 5 and second loads. The lighting device includes a voltage controller receiving a reading of the voltage peak from the detector and determining when the voltage peak is at least a voltage peak threshold. The voltage controller is configured to adjust a setting for the current generated by the current source based on the reading of the voltage peak.

8 Claims, 7 Drawing Sheets

(51) Int. Cl.
*H05B 47/105* (2020.01)
*H05B 45/54* (2020.01)

(56) References Cited

U.S. PATENT DOCUMENTS

| | | | | |
|---|---|---|---|---|
| 2011/0128303 | A1* | 6/2011 | Yonemaru | H05B 45/46<br>315/291 |
| 2014/0327860 | A1 | 11/2014 | Cao | |
| 2019/0008013 | A1* | 1/2019 | Diana | H05B 45/46 |

* cited by examiner

-- Prior Art --

Voltage Control Protector
400

Semiconductor Control Proctector
500

CLASS 2 CIRCUIT PROTECTION

CROSS-REFERENCE TO PRIOR APPLICATIONS

This application is the U.S. National Phase application under 35 U.S.C. § 371 of International Application No. PCT/EP2020/058279, filed on Mar. 25, 2020, which claims the benefit of U.S. Provisional Application No. 62/825,106, filed on Mar. 28, 2019, and European Patent Application No. 19167640.2, filed on Apr. 5, 2019. These applications are hereby incorporated by reference herein.

BACKGROUND INFORMATION

A power source may supply energy to various components of an electronic device. For example, the electronic device may include a lighting component (e.g., a light emitting diode (LED)). The illumination of the lighting component may be based on the operating parameters of the LED, the current received by the LED, etc. The electronic device may include a further lighting component. The two lighting components may operate in tandem to generate a predetermined illumination appearance (e.g., a selected shade). For example, the two lighting component electronic device may be a tunable white circuit.

The tunable white circuit may utilize two separate LEDs that operate at different lighting temperatures (e.g., measured in Kelvin (K)). The combined illumination effect of the two separate LEDs in the tunable white circuit generates a dynamically selectable luminance output through decreasing and increasing an intensity of the individual LEDs as well as modifying the lighting temperature. The tunable white circuit may include a cool white channel as the first LED and a warm white channel as the second LED. The control parameters may be brightness and color temperature. The tunable white circuit may utilize dimming information that is carried in a voltage waveform and delivered current to select the control parameters. Thus, the design of the tunable white circuit utilizes a controlled interaction between the two LEDs.

A conventional approach to design a tunable white circuit involves a current source, the plurality of LEDs, and a plurality of semiconductors (e.g., metal-oxide semiconductor field-effect transistor (MOSFET)) that manage LED operation. By controlling a current, the LEDs may be powered at a selected lighting temperature and a selected luminance may be achieved where a mixed light color temperature is determined by a ratio of warm light and cool light. This conventional approach switches the warm LED and the cool LED on and off alternatively, which will be described in further detail below. However, in view of the interaction between the two LEDs to generate the selected luminance, the conventional approach may be modified for a more controlled operation in generating a selected luminance.

FIG. 1 shows an exemplary lighting device 100 that is a tunable white circuit that dynamically selects control parameters for a plurality of LEDs utilizing a further control mechanism. For example, the lighting device 100 represents an electronic device including a circuit arrangement for a conventional tunable white circuit. As illustrated, the lighting device 100 includes a current source 105, an inductor 110, a lighting load 115, a lighting load 120, a semiconductor 125 associated with the lighting load 115, and a semiconductor 130 associated with the lighting load 120. The loads 115, 120 may each be a LED that operates at a selected lighting temperature (the terms "load" and "LED" to be used interchangeably herein). For example, the LED 115 may be a cool LED operating at a lighting temperature of 6500K while the LED 120 may be a warm LED operating at a lighting temperature of 2700K. The semiconductors 125, 130 may each be a MOSFET configured to switch or amplify signals (the terms "semiconductor" and "MOSFET" to be used interchangeably herein). The inductor 110 is introduced and positioned in the tunable white circuit to balance the current between the cool LED and the warm LED when forward voltage of the two LEDs is not exactly the same. In this manner, the inductor 110 provides a further control mechanism for the tunable white circuit.

In the lighting device 100, the current source 105 may generate a constant voltage V0. The average current in the inductor 110 may be the same as the current source 105. In a steady operating state, when a forward voltage of the two LEDs (e.g., denoted as VF1 for the LED 115 and VF2 for the LED 120) are different, the voltage for the constant current power source V0 may be an average voltage of the two LED strings. For example, V0 may be calculated as a sum of the product of an on duty cycle at VF1 and the product of an on duty cycle of VF2 (e.g., $V0=D\cdot VF1+(1-D)\cdot VF2$), where D is the on duty cycle of the cool LED during an overall cycle, 1-D is the other on duty cycle of the warm LED during the overall cycle). The voltage waveform at a positive end of the two LEDs 115, 120 may result in a square wave repeatedly alternating between VF1 and VF2 for the respective duration D and 1-D. The inductor 110 may provide the additional control in maintaining the voltage waveform of the two LEDs 115, 120.

The lighting device 100 may also be a commercially available product or used in an environment such that the design is to follow certain operating standards. For example, an operating standard set for North America may be a requirement that linear indoor LED drivers are to comply with class 2. Accordingly, in a particular implementation, the current source 105 may be an Underwriter Laboratories (UL) class 2 compliant current source. However, the operating standard may not extend to other components of the lighting device 100. For example, despite the voltage V0 generated by the current source 105 being class 2 compliant, when one of the LEDs 115, 120 fails resulting in an open circuit along a circuit pathway including the failed LED (e.g., the LED 115), the voltage peak Vp at the remaining operating one of the LEDs 115, 120 having the closed circuit (e.g., the LED 120) becomes significantly higher due to the inductor 110 operating in a free-wheeling manner. When this occurs, the operating one of the LEDs 115, 120, the inductor 110, etc. may not be class 2 compliant (e.g., exceeding the class 2 standard may result in a higher probability of causing a shock to a user). Thus, the introduction of the inductor 110 may provide an increased performance control of the tunable white circuit under normal operating conditions but also introduces a warm/cool problem when at least one of the LEDs 115, 120 fails.

SUMMARY

The exemplary embodiments are directed to a lighting device having circuit protection. The lighting device comprises a current source generating a current and a first load and a second load receiving the current. The lighting device comprises an inductor positioned between the current source and the first and second loads that balances the current powering the first and second loads. The lighting device comprises a detector monitoring a voltage peak of the first and second loads. The lighting device comprises a voltage controller receiving a reading of the voltage peak from the detector and determining when the voltage peak is at least a voltage peak threshold. The voltage controller is configured to adjust a setting for the current generated by the current source based on the reading of the voltage peak.

The exemplary embodiments are directed to a lighting device having circuit protection. The lighting device comprises a current source generating a current and a first load and a second load receiving the current. The lighting device comprises an inductor positioned between the current source and the first and second loads that balances the current powering the first and second loads. The lighting device comprises a first semiconductor and a second semiconductor managing the current flowing to the first load and the second load, respectively. The lighting device comprises a detector monitoring the voltage peak of the first and second loads. The lighting device comprises a comparator receiving a reading of the voltage peak from the detector and determining when the voltage peak is at least a comparator threshold. The comparator is configured to generate a signal when the voltage peak is at least the comparator threshold. The lighting device comprises a semiconductor controller configured to receive the signal and deactivate the first and second semiconductors.

The exemplary embodiments are directed to a lighting device having circuit protection. The lighting device comprises a current source generating a current and a first load and a second load receiving the current. The lighting device comprises an inductor positioned between the current source and the first and second loads that balances the current powering the first and second loads. The lighting device comprises a first semiconductor and a second semiconductor managing the current flowing to the first load and the second load, respectively. The lighting device comprises a first protection mechanism and a second protection mechanism. The first protection mechanism comprises a detector monitoring a voltage peak of the first and second loads. The first protection mechanism comprises a voltage controller receiving a reading of the voltage peak from the detector and determining when the voltage peak is at least a voltage peak threshold. The voltage controller is configured to adjust a setting for the current generated by the current source based on the reading of the voltage peak. The second protection mechanism comprises a further detector monitoring the voltage peak of the current. The second protection mechanism comprises a comparator receiving a further reading of the voltage peak from the further detector and determining when the voltage peak is at least a comparator threshold. The comparator is configured to generate a signal when the voltage peak is at least the comparator threshold. The second protection mechanism comprises a semiconductor controller configured to receive the signal and deactivate the first and second semiconductors.

DETAILED DESCRIPTION

Figure 1:
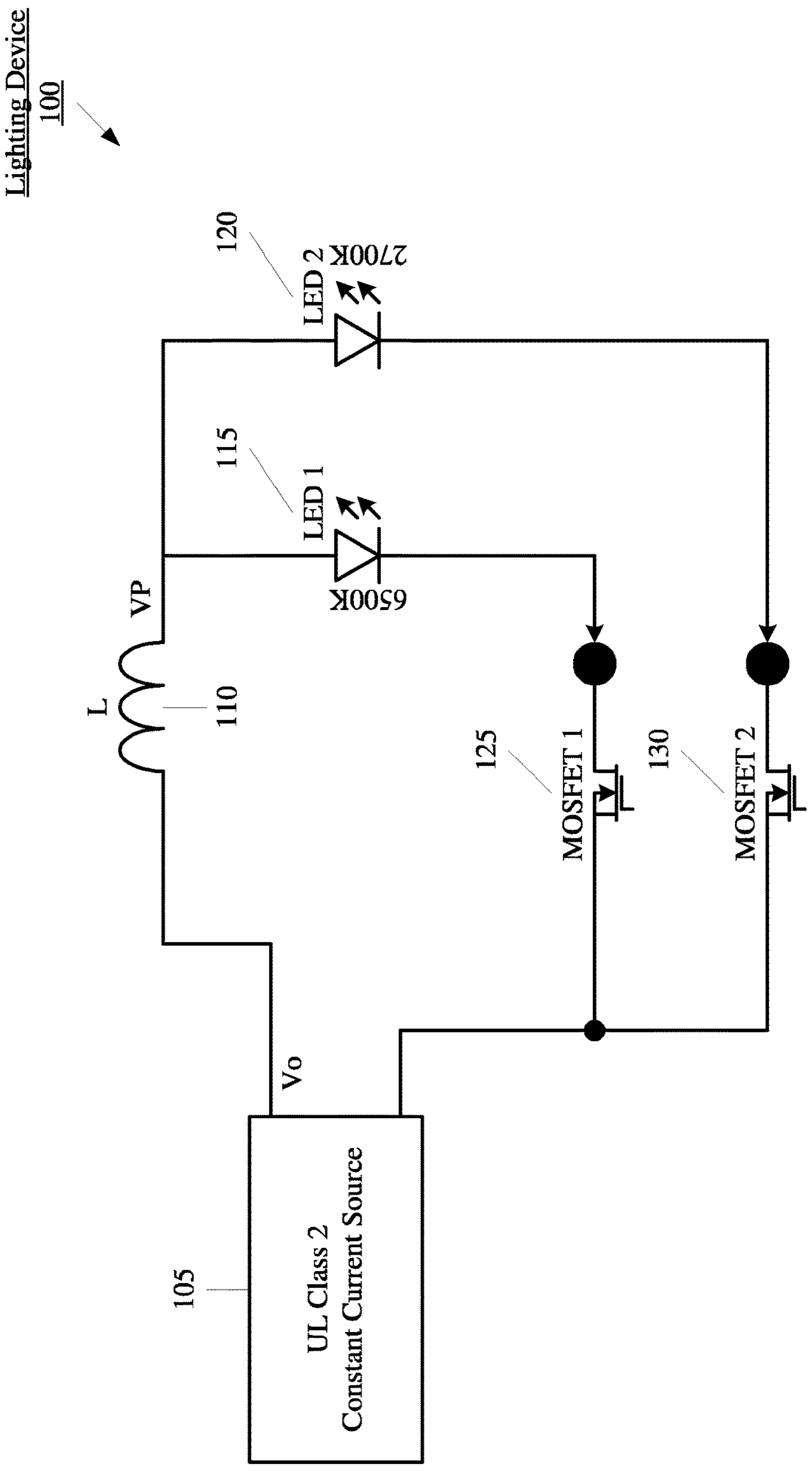
FIG. 1 shows an exemplary lighting device.

The exemplary embodiments may be further understood with reference to the following description and the related appended drawings, wherein like elements are provided with the same reference numerals. The exemplary embodiments are related to a device, a system, and a method for protecting a class 2 circuit of an electronic device configured as a tunable white circuit including a plurality of loads. The exemplary embodiments provide a protection mechanism that addresses an open circuit high voltage issue on a first load resulting from a second load failing. Through using the exemplary embodiments to address this scenario, the class 2 circuit may remain class 2 compliant. The protection mechanism according to the exemplary embodiments provides a first protector based on a voltage control and a second protector based on a semiconductor control.

The exemplary embodiments are described with regard to particular circuitry components that are interconnected within the tunable white circuit of the electronic device. The exemplary embodiments are also described with regard to these particular circuitry components being arranged in a specific configuration. However, the types of circuitry components and the specific arrangement are only for illustrative purposes. Different types of circuitry components and different arrangements may also be used within the scope of the exemplary embodiments to achieve a substantially similar protection to the above noted scenario where voltage peaks on functioning loads exceeds class 2 compliance standards. In a first example, the load of the electronic device is described as a diode such as a light emitting diode (LED). However, the load may be any sub-component that draws power to activate the sub-component or stops drawing power to deactivate the sub-component. In a second example, the semiconductor of the electronic device is described as a metal oxide semiconductor field effect transistor (MOSFET). However, the semiconductor may be any component that is configured to control the operation of the respective load for which it is responsible.

The exemplary embodiments are further described with regard to certain values of the components in the tunable white circuit. For example, the values may be lighting temperatures. However, these exemplary values pertain to selected lighting temperatures of LEDs such that an interaction of the LEDs generates a selected luminance. In another example, the values may be a voltage peak that is monitored. However, these exemplary values pertain to a design selection based on class 2 compliance standards. Accordingly, if a different standard were selected or a tolerance range within the compliance standard were selected, a threshold associated with the voltage peak may be modified. Thus, any values used to describe the operation of the tunable white circuit according to the exemplary embodiments is only for illustrative purposes and other values may be used within the scope of the exemplary embodiments.

The exemplary embodiments provide a protection mechanism in a tunable white circuit lighting device that provides protection against conditions resulting in a voltage peak that exceeds an acceptable threshold. The protection mechanism may be embodied in a first protector that is configured with a voltage control. The voltage control may detect when the voltage peak exceeds the acceptable threshold and adjust the voltage or current being output to the loads. The protection mechanism may also be embodied in a second protector that is configured with a semiconductor control. The semiconductor control may receive a signal that triggers the semiconductor control to deactivate the semiconductors that results in the loads from receiving further power. The protection mechanism may also incorporate both the first protector and the second protector (e.g., in view of class 2 compliance requirements for a redundant protection circuit).

Figure 2:
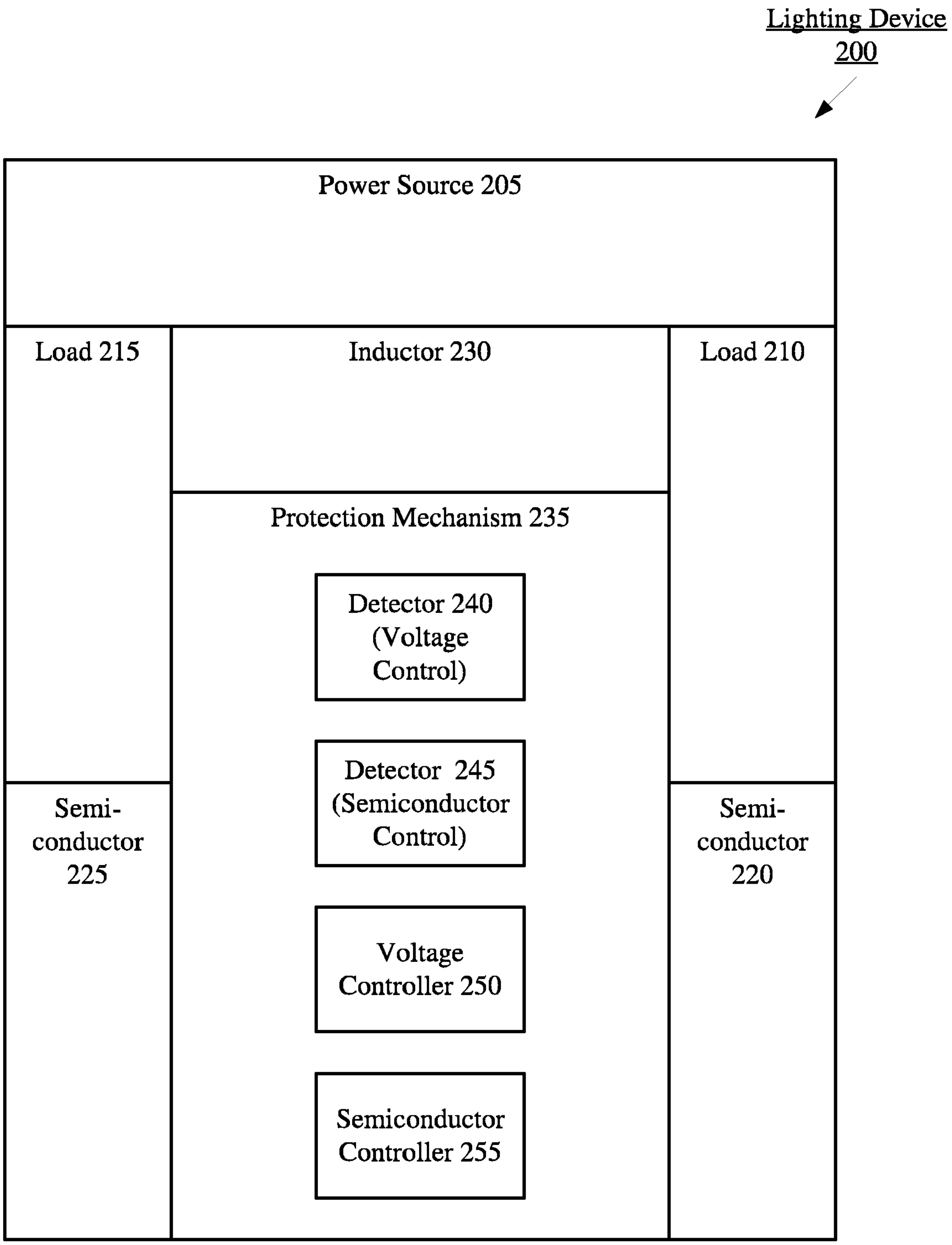
FIG. 2 shows an exemplary lighting device according to the exemplary embodiments.

FIG. 2 shows an exemplary lighting device 200 according to the exemplary embodiments. The lighting device 200 includes a power source 205 and a plurality of loads 210, 215. The loads 210, 215 may be any type of component that draws power (e.g., a LED, a light bulb, an audio output component, etc.). For illustrative purposes, the loads 210, 215 are described in the exemplary embodiments as LEDs (the terms "load" and "LED" being used interchangeably herein). The lighting device 200 also includes a plurality of semiconductors 220, 225 corresponding to each load 210, 215. For example, the semiconductor 220 may be associated with the load 210 and the semiconductor 225 may be associated with the load 215. The semiconductors 220, 225 may be any type of component that manages the operation of the loads 210, 215. For example, the semiconductors 220, 225 may control a current that is supplied to the loads 210, 215. For illustrative purposes, the semiconductors 220, 225 are described in the exemplary embodiments as MOSFETs (the terms "semiconductor" and "MOSFET" being used interchangeably herein). The lighting device may also include an inductor 230 that provides an additional performance control mechanism for the operation of the loads 210, 215. The lighting device 200 may include a protection mechanism 235 that dynamically protects the LEDs 210, 215 and the corresponding LED strings including the LEDs 210, 215.

As a tunable white circuit, the LEDs 210, 215 may operate at a selected lighting temperature. For example, the LED 210 may be a cool LED operating at 6500K and the LED 215 may be a warm LED operating at 2700K. When in operation, the LEDs 210, 215 may alternate between an on period and an off period. Accordingly, while the LED 210 is on, the LED 215 may be off and vice versa. To achieve a particular luminance based on the selected lighting temperatures of the LEDs 210, 215, the LEDs 210, 215 may operate using an overall cycle in which a portion of the overall cycle is devoted to an on duty cycle of the LED 210 and a remaining portion of the overall cycle is devoted to an on duty cycle of the LED 215. The overall cycle may have a voltage waveform that is a square wave alternating between a forward voltage across each of the LEDs 210, 215 for a duration corresponding to the respective on duty cycle. The inductor 230 may enable the square wave to be maintained at the intended voltage and duration to provide the performance control.

The protection mechanism 235 may include a detector 240 associated with a voltage controller 250. The detector 240 and the voltage controller 250 may be the first protector of the protection mechanism 235. The detector 240 may detect or monitor a voltage peak in the tunable white circuit. The detected voltage peak may be fed back to the voltage controller 250. The voltage controller 250 may be configured to adjust the current output by the power source 205. For example, the voltage controller 250 may determine a setting that the power source 205 is to use based on the voltage peak output from the detector 240 such that the tunable white circuit remains class 2 compliant. According to a particular implementation, the voltage controller 250 may utilize a voltage peak threshold where any voltage peak that is below the voltage peak threshold does not trigger the voltage controller 250 to adjust the current. When the voltage peak is at least the voltage peak threshold, the voltage controller 250 may adjust the current output by the power source 205 in a dynamic manner (e.g., set the current on the power source 205 lower so that a subsequent voltage peak reading by the detector 240 reaches, at most, the voltage peak threshold). Thus, while the voltage peak remains above the voltage peak threshold as detected by the detector 240, the voltage controller 250 may continuously adjust the setting of the power source 205 to control the current being output (e.g., set the current lower if the detected voltage peak that is above the voltage peak threshold has increased, set the current higher if the detected voltage peak that is above the voltage peak threshold has decreased, etc.).

The detector 240 and the voltage controller 250 may also be used after the condition that presented the high voltage issue has been addressed. For example, after the condition has been addressed, the voltage peak that is detected may no longer be above the voltage peak threshold. The voltage controller 250 may adjust the setting for the current of the power source 205 so that the subsequent voltage peak that is detected reaches, at most, the voltage peak threshold. In this scenario, the voltage controller 250 may raise the setting for the current to a value corresponding to a normal operating state of the tunable white circuit.

The protection mechanism 235 may further include a detector 245 associated with a semiconductor controller 255. The detector 245 and the semiconductor controller 255 may be the second protector of the protection mechanism 235. The detector 245 may detect or monitor a voltage peak in the tunable white circuit in a manner substantially similar to the detector 240. The detected voltage peak output by the detector 245 may be compared to a comparator threshold. When the detected voltage peak is at least the comparator threshold, the semiconductor controller 255 may receive a signal indicating an operation to be performed. For example, the semiconductor controller 255 may be configured to deactivate the semiconductors 220, 225. The comparator threshold may be set to a value that is indicative of the tunable white circuit exceeding values corresponding to the class 2 compliance standard. For example, the comparator threshold may be substantially similar in value to the voltage peak threshold. Accordingly, the second protector may be configured to provide an automatic shutdown mechanism for the tunable white circuit by preventing any further current from flowing through a remaining, functioning LED when the other LED has failed.

To re-activate the semiconductors 220, 225, the tunable white circuit may be reset. For example, the semiconductor control 255 may have a default position to keep the semiconductors 220, 225 in an activated state. In another manner, the semiconductor control 255 may detect when a signal is not being received based on the output from the detector 245. When no signal is being received, the semiconductor control 255 may revert to setting the semiconductors 220, 225 in an activated state. Thus, during times when a signal is received, the semiconductor control 255 may deactivate the semiconductors 220, 225 and during times when no signal is received, the semiconductor control 255 may activate the semiconductors 220, 225. When transitioning from a deactivated state to an activated state, the semiconductor control 255 may determine when no signal is received for a predetermined duration of time to eliminate random instances when this condition occurs and to ensure this transition is when this condition persists.

The lighting device 200 including the first protector and the second protector is only illustrative. Those skilled in the art will appreciate that the first protector or the second protector acting alone may sufficiently provide the protection during the high voltage issue scenario where a functioning load experiences the high voltage peak when another load has failed. Accordingly, in other implementations, the lighting device 200 may include one or the other protector in the protection mechanism. The lighting device 200 may also be configured as illustrated to ensure that the protection is provided through a secondary manner of protecting the circuit pathways and the loads. The lighting device 200 may further include the first and second protector in the protection mechanism 235 to comply with various standards. For example, the class 2 compliance standard requires that a redundant safety mechanism be provided in the lighting device 200. Accordingly, to also satisfy the class 2 compliance standard, the lighting device 200 may include both the first protector and the second protector. The inclusion of both protectors may be arranged such that one protector may act as a primary while the other protector may act as a secondary or both protectors may act in a similar capacity to afford protection to the tunable white circuit.

The lighting device 200 is illustrated where the components are incorporated into one overall electronic device. However, in another implementation, the components of the lighting device 200 may be at least partially separated from one another while having a communication functionality, may be modular components (e.g., separate components connected to one another), may be incorporated into one or more devices, or a combination thereof. For example, the lighting device 200 may include the detectors 240, 245 that provide outputs to a modular determination component that sends a signal to a corresponding component (e.g., the voltage controller 250, the semiconductor controller 255, etc.). The lighting device 200 may also utilize a wired connection between the components. However, those skilled in the art will understand that any manner of communication of signals, power, or other indications/commands may be used between the components of the lighting device 200. For example, a wired connection, a wireless connection, a network connection, or a combination thereof may be used.

Figure 3:
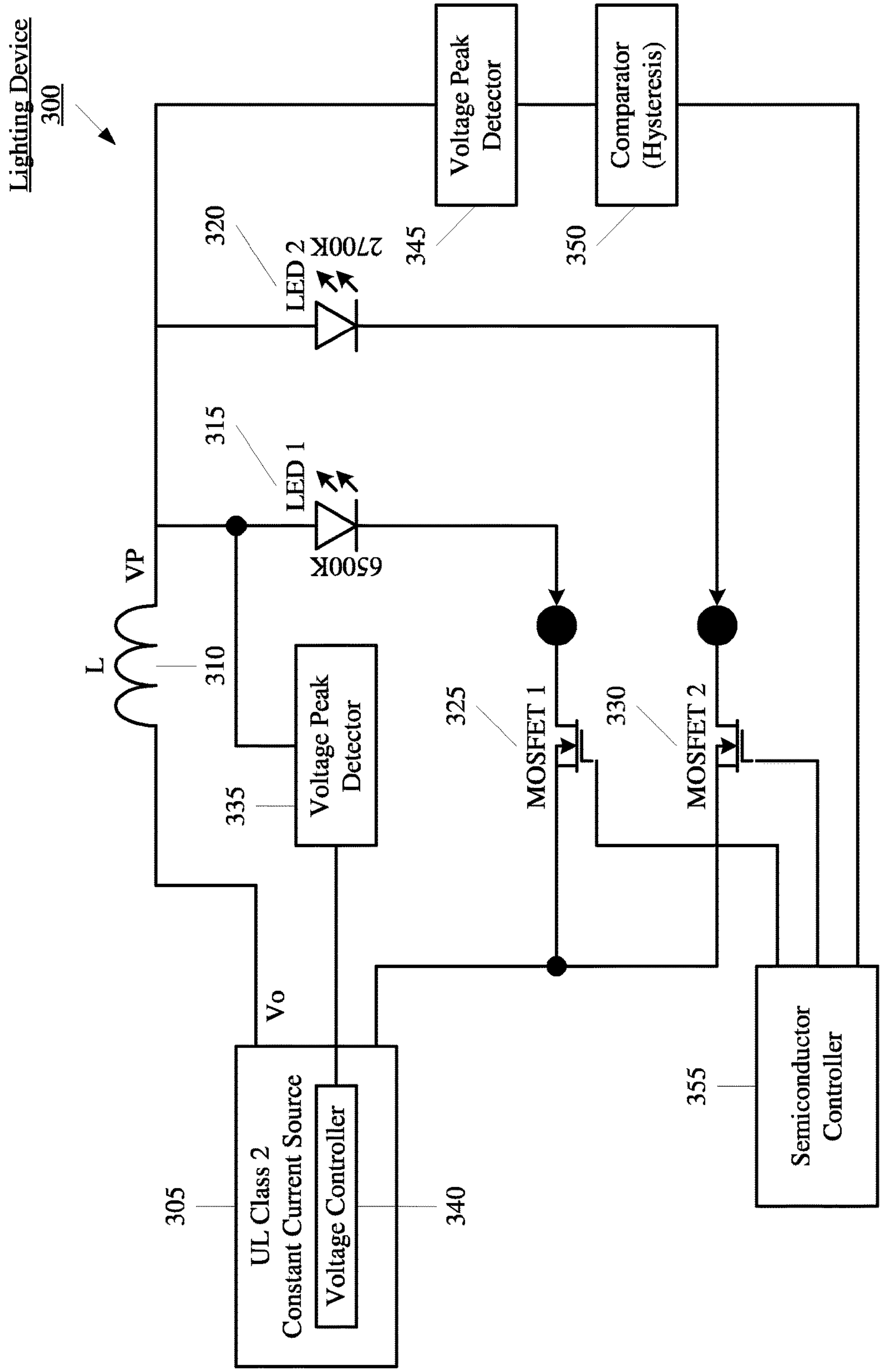
FIG. 3 shows an exemplary implementation of a lighting device according to the exemplary embodiments.

FIG. 3 shows an exemplary implementation of a lighting device 300 according to the exemplary embodiments. The lighting device 300 may be a particular arrangement of the lighting device 200 of FIG. 2 according to the exemplary embodiments. The implementation of the lighting device 300 illustrated in FIG. 3 relates to the protection mechanism 235 utilizing the first protector including the detector 240 and the voltage controller 250 and the second protector including the detector 245 and the voltage controller 255. The lighting device 300 may include a current source 305, an inductor 310, LEDs 315, 320, MOSFETs 325, 330, a voltage peak detector 335 with a voltage controller 340, and a voltage peak detector 345 with a comparator 350, and a semiconductor controller 355.

The implementation of the lighting device 300 in FIG. 3 may be any circuitry implementation in which the components are interconnected with one another for signals to be exchanged and current to be supplied, detected, and modified along various circuit pathways. These components may be included on one or more integrated circuits, on one or more printed circuit boards, or implemented individually as needed. The exemplary implementation of the lighting device 300 described herein relates to the lighting device 300 being a set of circuitry components. However, the lighting device 300 may also be implemented in a variety of other ways. For example, the lighting device 300 may include more complex components, particularly if dynamic settings (e.g., greater than two settings) are to be used.

In this example, the lighting device 300 may include the LED 315 operating as a cool LED at 6500K and the LED 320 operating as a warm LED at 2700K. As illustrated, in the implementation of FIG. 3, the tunable white circuit includes the inductor 310 to provide a performance control while introducing a high voltage issue that places the tunable white circuit beyond class 2 compliance standards on one of the LEDs 315, 320 when the other one of the LEDs 315, 320 fails. The lighting device 300 also includes both the first protector and the second protector.

The current source 305 may be a UL class 2 compliant power source outputting a voltage V0 at a selected current (e.g., as set by the voltage controller 340). The current may flow to the inductor 310 that stores the energy in a magnetic field to be distributed to the LEDs 315, 320. Depending on the overall cycle and the on duty cycle for each LED 315, 320, the LEDs 315, 320 may be illuminated at scheduled times. The MOSFETs 325, 330 may be in a default, activated state that enables the circuit to be closed for the LED 315, 320, respectively, which effectively controls when the LEDs 315, 320 are "activated" or available for use.

In using the protection mechanism 235, one of the LEDs 315, 320 may fail leading to a high voltage scenario. For example, the LED 320 may fail (e.g., leading to an open circuit). Accordingly, the LED 315 which is still functional (e.g., maintains a closed circuit) may have a peak voltage that measures in excess of a class 2 compliant standard (e.g., during times when the duty cycle of the LED 315 is off). The protection mechanism 235 may be configured to monitor when such a peak voltage occurs to perform subsequent operations to remedy this condition.

In using the first protector including the voltage peak detector 335 and the voltage controller 340, in a manner substantially similar to the manner described above with regard to the lighting device 200 of FIG. 2, the voltage peak detector 335 may monitor the voltage peak occurring in the tunable white circuit while current is flowing from the current source 305. The voltage peak detector 335 may output the voltage peak to the voltage controller 340 which then determines whether to alter the setting of an output current generated by the current source 305. The voltage controller 340 may utilize a voltage peak threshold based on a class 2 compliance standard that results in the tunable white circuit remaining class 2 compliant. Thus, when the voltage controller 340 receives a voltage peak from the voltage peak detector 335 that registers in excess of the voltage peak threshold, the voltage controller 340 may adjust the setting for the current output by the current source 305. When the overall cycle of the voltage waveform is a square wave and only the LED 320 has failed, the voltage peak that is at least the voltage peak threshold may repeat during the on duty cycle of the LED 320. In this manner, the voltage controller 340 may identify when the LED 320 has likely failed. When the voltage controller 340 has adjusted the setting of the current output by the current source 305 based on the detected voltage peak output by the voltage peak detector 335, the tunable white circuit may again be class 2 compliant.

As described above, the voltage peak threshold may enable the voltage controller 340 to determine how to set the current output by the current source 305. For example, while the voltage peak is at least the voltage peak threshold, the voltage controller 340 may dynamically select the proper current setting so that the tunable white circuit is class 2 compliant. In another example, while the voltage peak is less than the voltage peak threshold, the voltage controller 340 may select a maximum current setting in which the tunable white circuit is class 2 compliant.

In using the second protector including the voltage peak detector 345, the comparator 350, and the semiconductor controller 355, in a manner substantially similar to the manner described above with regard to the lighting device 200 of FIG. 2, the voltage peak detector 345 may monitor the voltage peak occurring in the tunable white circuit while current is flowing from the current source 305. When both the first protector and the second protector are part of the lighting device 300, the voltage peak detector 335 and the voltage peak detector 345 should measure substantially identical voltage peaks. The voltage peak detector 345 may output the voltage peak to the comparator 350 which then determines whether to generate a signal to be transmitted to the semiconductor controller 355. The comparator 350 may be configured with hysteresis to compensate for any lag issues in view of the incorporation of the inductor 310 and the square voltage waveform. The comparator 350 may be set with a comparator threshold that determines when to select a circuit pathway that sends a signal to the semiconductor controller 355. In the scenario where the LED 320 has failed and the voltage peak measured during the on duty cycle of the LED 320 results in the high voltage for the LED 315, the comparator 350 may generate and transmit the signal to the semiconductor controller 355. Upon receipt of the signal, the semiconductor controller 355 may deactivate both the MOSFETs 325, 330. By deactivating the MOSFETs 325, 330, the LEDs 315, 320 may no longer receive current, thereby placing the tunable white circuit in a condition that is class 2 compliant.

As described above, the comparator threshold may define an on/off setting of the MOSFETs 325, 330 by either transmitting a signal or remaining passive. The comparator threshold may be substantially similar in value to the voltage peak threshold.

Figure 4:
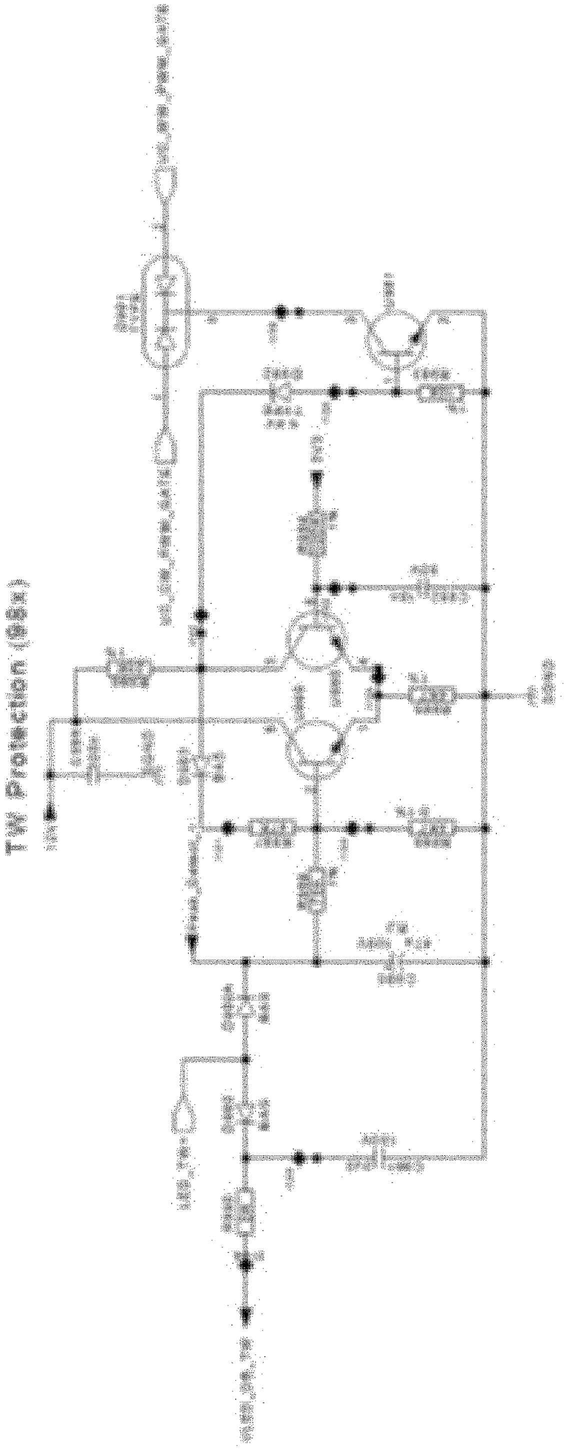
FIG. 4 shows an exemplary implementation of a voltage control protector used in the implementation of FIG. 3 according to the exemplary embodiments.

FIG. 4 shows an exemplary implementation of a voltage control protector 400 used in the implementation of FIG. 3 according to the exemplary embodiments. The voltage control protector 400 illustrates an exemplary circuitry arrangement that may be used to achieve the operations described above for the first protector of the protection mechanism 235. However, the voltage control protector 400 may utilize a different circuitry arrangement within the scope of the exemplary embodiments and still perform the above described operations in protecting the tunable white circuit. In the voltage control protector 400, peak voltage detection 1 comprises of D980 and C981 where the voltage peak on C981 is fed to the voltage feedback control circuit. The voltage feedback control circuit may regulate the voltage on C981 to be the same or lower than a predetermined voltage setting (e.g., 56V), which will be always lower than the UL class 2 compliance standard limit (e.g., 60V). Peak voltage detection 2 comprises of D980A and C980 where the voltage peak on C980 is divided by resistors R988 and R989. The Voltage on R988 compares with reference voltage 3V3 (e.g., 3.3V). The components U980, R985, and R986 create an accurate comparator when the voltage on R988 is higher than the reference voltage (e.g., 3.3V). When a collector of U980 (e.g., pin 3) becomes high, through D983 and R987, to create a hysteresis, through Zener D982, the transistor U981 is turned on. Through dual diode D981, 2 MOSFET driving signals in the voltage control protector 400 is pulled low and the MOSFETs U951 and U952 are turned such that the output voltage at LEDTW+ is the same as VLED+, which is compliant with the UL class 2 standard. The voltage control protector 400 keeps output voltages at LEDTW+ to always be below the UL class 2 standard limit (e.g., 60V) even with single fault in one of the LEDs 315, 320.

Figure 5:
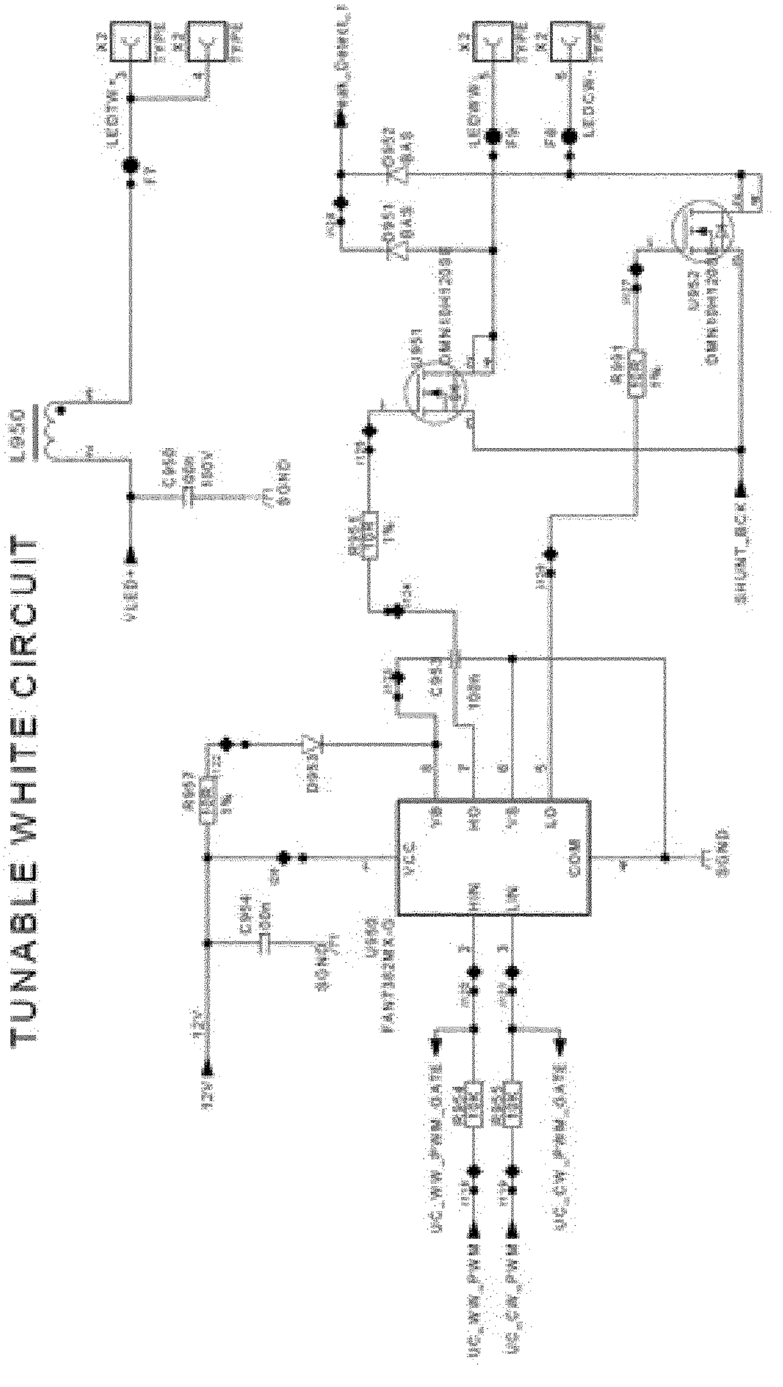
FIG. 5 shows an exemplary implementation of a semiconductor control protector used in the implementation of FIG. 3 according to the exemplary embodiments.

FIG. 5 shows an exemplary implementation of a semiconductor control protector 500 used in the implementation of FIG. 3 according to the exemplary embodiments. The semiconductor control protector 500 includes X2 which are the connection terminals. The warm LED strings including the warm LED 320 is connected between LEDTW+ and LEDWW− and the cool LED strings including the cool LED 315 is connected between LEDTW+ and LEDCW−. The inductor L950 keeps a current balance between the two LED strings. The MOSFETs U951 and U952 are turned on alternatively with a fixed frequency. U950 is a 2 channel MOSFET driving integrated circuit. Signals UC_WW_PWM and UC_CW_PWM are from a microcontroller that controls the duty cycle of the LEDs 315, 320.

Figure 6:
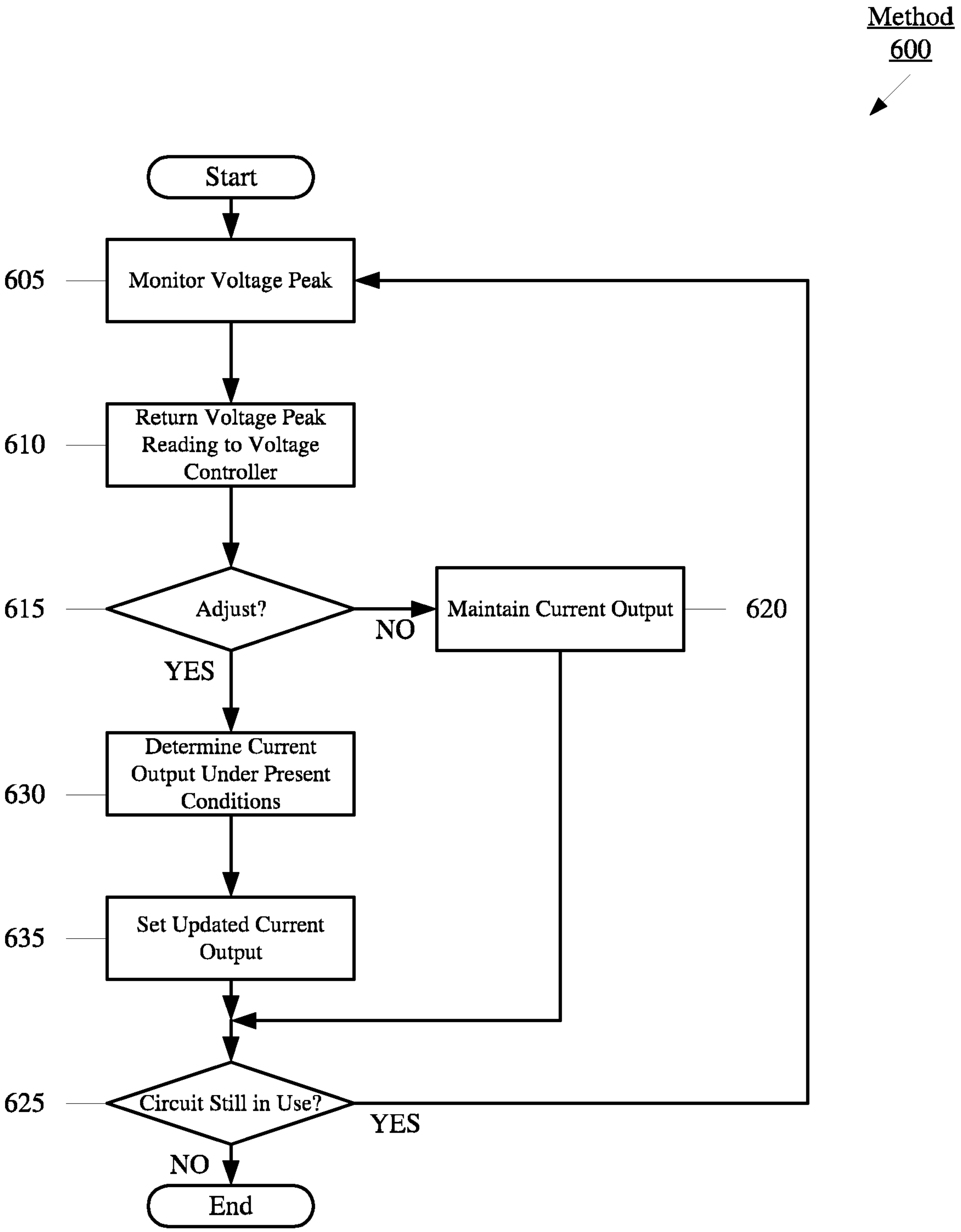
FIG. 6 shows a method for protecting a lighting device using a voltage control protector according to the exemplary embodiments.

FIG. 6 shows a method 600 for protecting a lighting device using a voltage control protector 400 according to the exemplary embodiments. The method 600 may relate to the mechanism of the exemplary embodiments in which the voltage controller 240 is used to protect the lighting device 200 and stay within standards set forth for the type of device that the lighting device 200 is (e.g., class 2). The method 600 will be described from the perspective of the voltage controller 240 (e.g., as implemented in the voltage control protector 400) as well as the implementation of the lighting device 300 as circuitry units as illustrated in FIG. 3. Substantially similar components of the lighting device 200 and exemplary implementation of the lighting device 300 will be used interchangeably.

In 605, the voltage peak detector 335 monitors the voltage peak of the tunable white circuit. Under normal operating conditions, the voltage peak should not exceed a voltage peak threshold. However, particularly through the introduction of the inductor 310, there may be scenarios when one of the LEDs 315, 320 fails leading to a high voltage issue arising in which the functional one of the LEDs 315, 320 exhibits a voltage peak which is at least the voltage peak threshold. In 610, the voltage peak detector 335 transmits the reading of the voltage peak to the voltage controller 340.

In 615, the voltage controller 340 determines whether to adjust the setting of the current that is output by the current source 305. For example, the voltage peak that is received from the voltage peak detector 335 may be less than the voltage peak threshold. Accordingly, in 620, the voltage controller 340 maintains a setting of the current to be output by the current source 305. Assuming no previous modifications, the setting may be a maximum current that allows the tunable white circuit to be class 2 compliant (e.g., with any tolerances that may be factored). The first protector then proceeds to 625 where it determines whether the tunable white circuit is still in use. If still in use, the first protector returns to 605 to continue monitoring the voltage peak in the tunable white circuit.

Returning to 615, in another example, the voltage peak that is received from the voltage peak detector 335 may be greater than the voltage peak threshold. Accordingly, in 630, the voltage controller determines a setting to be used for the current to be output by the current source 305 in view of the high voltage scenario. In 635, the voltage controller 340 sets the updated current of the current source 305. The first protector then proceeds to 625.

Figure 7:
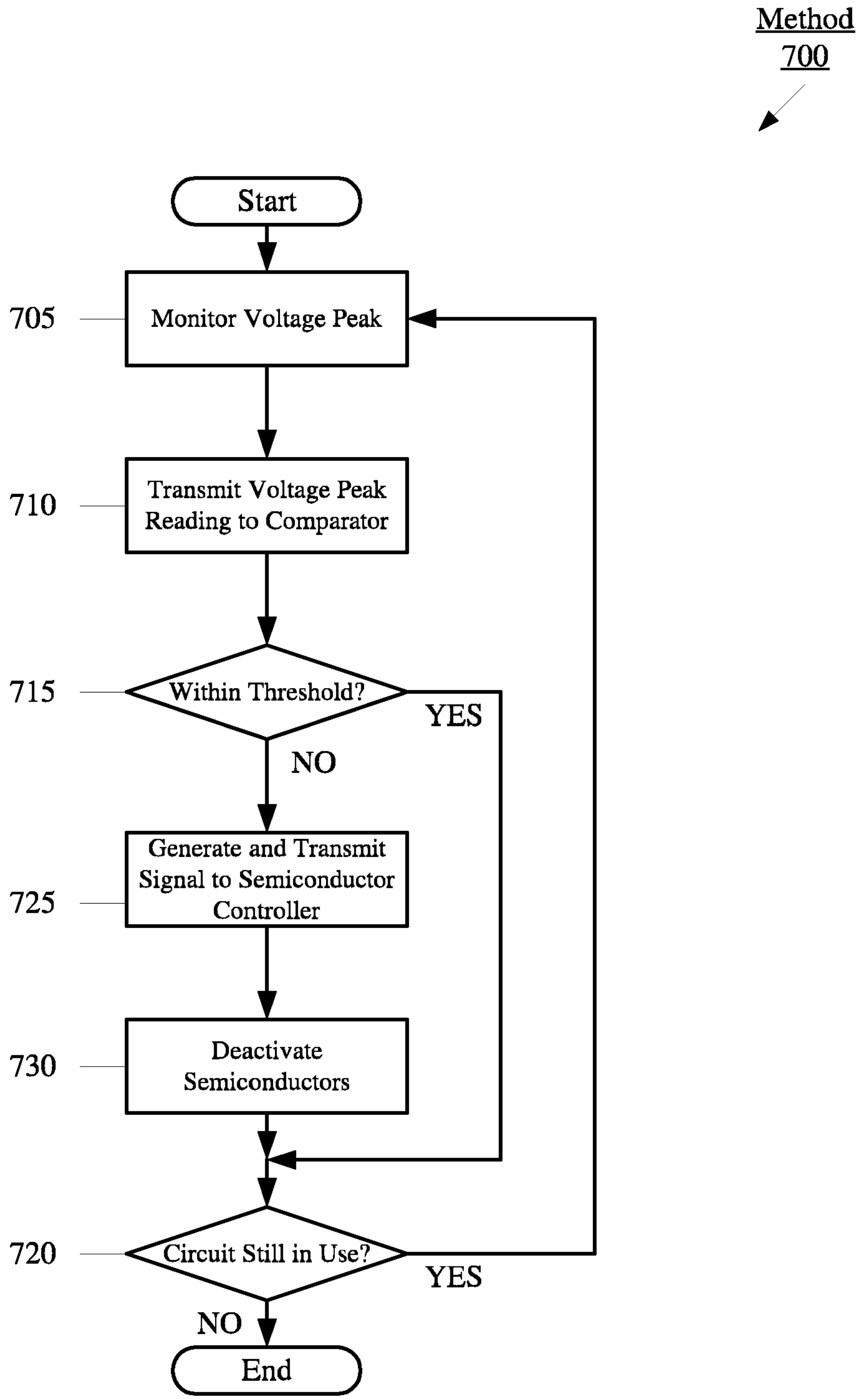
FIG. 7 shows a method for protecting a lighting device using a semiconductor control protector according to the exemplary embodiments.

FIG. 7 shows a method 700 for protecting a lighting device using a semiconductor control protector 500 according to the exemplary embodiments. The method 700 may relate to the mechanism of the exemplary embodiments in which the semiconductor controller 245 is used to protect the lighting device 200 and stay within standards set forth for the type of device that the lighting device 200 is (e.g., class 2). The method 700 will be described from the perspective of the semiconductor controller 245 (e.g., as implemented in the semiconductor control protector 500) as well as the implementation of the lighting device 300 as circuitry units as illustrated in FIG. 3. Substantially similar components of the lighting device 200 and exemplary implementation of the lighting device 300 will be used interchangeably.

In 705, the voltage peak detector 345 monitors the voltage peak of the tunable white circuit. The voltage peak detector 345 may monitor the voltage peak in a manner substantially similar to the voltage peak detector 335 as described above in the method 600 except with a comparator threshold. However, the particular manner with which the voltage peak is measured may differ based on implementation (e.g., the differing approaches of the circuit implementations of the voltage control protector 400 and the semiconductor control protector 500). In 710, the voltage peak detector 345 transmits the reading of the voltage peak to the comparator 350.

In 715, the comparator 350 determines whether the voltage peak reading is within the comparator threshold. If less than the comparator threshold, the comparator 350 selects a default circuit pathway that places the comparator 350 in a passive state such that the operations conditions are maintained. The second protector then continues to 720 to determine whether the tunable white circuit is still in use. If still in use, the second protector returns to 705 to continue monitoring the voltage peak in the tunable white circuit.

Returning to 715, if the voltage peak reading is at least the comparator threshold, in 725, the comparator 350 selects another circuit pathway resulting in a signal being generated and transmitted to the semiconductor controller 355. In 730, the semiconductor controller 355 deactivates the MOSFETs 325, 330. The second protector then proceeds to 720.

As described above and as illustrated in the lighting devices 200, 300, the protection mechanism 235 may include both the first protector including the detector 240 and the voltage controller 250 and the second protector including the detector 245 and the semiconductor controller 255. Thus, the methods 600 and 700 being described as separate protection approaches is only illustrative of when the tunable white circuit utilizes a single protector. However, the methods 600 and 700 may be combined and the results from using either the method 600 or the method 700 may be incorporated into an overall combined method that may affect how the other one of the method 600 or 700 is performed.

The exemplary embodiments provide a device, system, and method of protecting a tunable white circuit of an electronic device including at least two loads that may be managed by respective semiconductors. The protection mechanism according to the exemplary embodiments address a high voltage issue scenario when a first load fails and a second functional load experiences a voltage peak that may exceed an intended maximum (e.g., as set by a compliance standard). The protection mechanism provides a first protector that monitors a voltage peak and adjusts a current setting of a current source based on the voltage peak. The protection mechanism also provides a second protector that may operate in tandem or individually from the first protector that also monitors a voltage peak and deactivates the semiconductors so that power is not supplied to the LEDs. The protection mechanism may further incorporate both the first protector and the second protector when an increased protection mechanism is to be used, a redundant approach is to be applied, and/or a compliance standard is to be met.

Those skilled in the art will understand that the above-described exemplary embodiments may be implemented in any suitable software or hardware configuration or combination thereof. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A lighting device, comprising:

a current source generating a current;

a first load and a second load receiving the current;

a first semiconductor and a second semiconductor managing the current flowing to the first load and the second load, respectively;

an inductor positioned between the current source and the first and second loads to balance the current between the first and second loads;

a detector monitoring a voltage peak from the current source to the first and second loads; and a voltage controller receiving a reading of the voltage peak from the detector and determining when the voltage peak is at least a voltage peak threshold, the voltage controller configured to adjust a setting for the current generated by the current source based on the reading of the voltage peak;

a comparator receiving a further reading of the voltage peak from a further detector and determining when the voltage peak is at least a comparator threshold when one of the first load and the second load has failed resulting in an open circuit and the other one of the first load and the second load remains functional, the functional load experiencing the voltage peak that is at least the voltage peak threshold, the comparator configured to generate a signal when the voltage peak is at least the comparator threshold; and a semiconductor controller configured to receive the signal and deactivate the first and second semiconductors.

2. The lighting device of claim 1, wherein the first load and the second load are light emitting diodes (LEDs).

3. The lighting device of claim 1, wherein, when the voltage peak is less than the voltage peak threshold, the voltage controller is configured to select a maximum setting for the current generated by the current source, the maximum setting being based on a predetermined current setting.

4. The lighting device of claim 3, wherein the compliance standard is an Underwriters Laboratory (UL) class 2 compliance standard.

5. The lighting device of claim 1, wherein the comparator is configured with a hysteresis to compensate for a lag introduced in the reading of the voltage peak.

6. The lighting device of claim 1, wherein the lighting device is a tunable white circuit electronic device.

7. The lighting device of claim 5, wherein the first load is a first lighting component having a first lighting temperature of 6500K and the second load is a second lighting component having a second lighting temperature of 2700K.

8. The lighting device of claim 1, wherein the voltage peak is at least the voltage peak threshold when one of the first load and the second load has failed and the other one of the first load and the second load remains functional, the functional load experiencing the voltage peak that is at least the voltage peak threshold.

* * * * *